N. H. LINES.
HEATER.
APPLICATION FILED DEC. 16, 1912.
1,056,345. Patented Mar. 18, 1913.
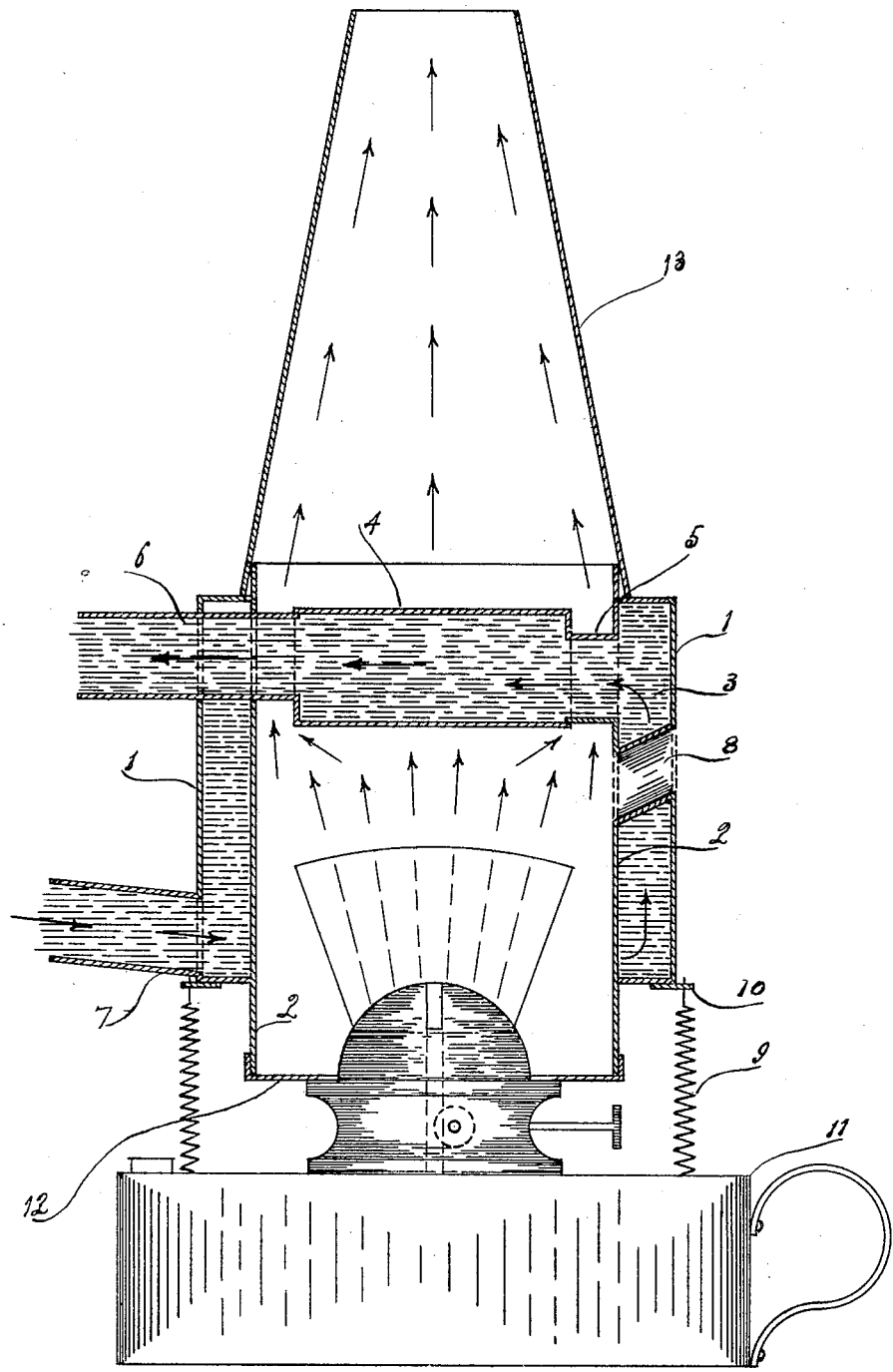
WITNESSES. INVENTOR.

UNITED STATES PATENT OFFICE.

NEWTON H. LINES, OF LOUISIANA, MISSOURI.

HEATER.

1,056,345.

Specification of Letters Patent.

Patented Mar. 18, 1913.

Original application filed November 21, 1912, Serial No. 732,794. Divided and this application filed December 16, 1912. Serial No. 736,927.

*To all whom it may concern:*

Be it known that I, NEWTON H. LINES, a citizen of the United States, residing at Louisiana, in the county of Pike and State of Missouri, have invented certain new and useful Improvements in Heaters; and I do declare the following to be a full, clear, and exact description of the invention, such as will enable others skilled in the art to which it implies to make and use the same.

This invention is intended to provide a heater for heating and circulating water.

This case is a division of a copending case Ser. No. 732,794, filed Nov. 21, 1912, for brooder.

The purpose of the invention is the provision of a novel heating device which insures a thorough circulation of the water and economy in the use of fuel, said heating device embodying a spreader tank which is located directly above the flame of the lamp and within the body of the main heater, thereby supplementing the action thereof and insuring a rapid circulation of the water.

This invention consists of the novel feature, details of construction and combination of parts which hereinafter will be more particularly set forth, illustrated in the accompanying drawing and pointed out in the appended claim.

Referring to the drawing forming a part of the specifications, the figure is an enlarged sectional view of the heater.

Corresponding and like parts are referred to in the following description; and indicated in the drawing by the same reference characters.

This heater comprises concentric shells 1 and 2 which inclose a water space 3, the inner shell 2 projecting above and below the outer shell 1, the upper projecting portion forming a collar to receive the lower end of chimney 13, the lower projecting portion making close connection with the lamp base 12. The construction is such as to admit of the chimney 13 being removed for convenience in cleaning or shipping. The lamp 11 is suspended from the heater by means of coil springs 9 which are attached at their lower end to the body of the lamp and are adapted to have their upper end engage pins 10 which project laterally from the boiler. A short pipe 8 extends across the water space 3 and through the shells 1 and 2 and admits of observing the flame of the lamp. A spreader tank 4 is located within the upper portion of the boiler and spaced therefrom to provide proper space for lamp draft. This spreader tank 4 is hollow and is connected at one point with the water space 3 by means of a short pipe 5, the pipe 6 extending through the water space 3 and directly connecting the spreader tank 4 with the heating pipes, thus forming a forced circulation. The spreader tank 4 acts as a supplementary heater, the water after being initially heated in the boiler being further heated in its passage through the tank 4 just prior to its passing into the heat radiating pipes. The return pipe is indicated at 7 and connects with the water space 3 at the bottom thereof, hence the water is gradually heated in the boiler and is forced through the heating pipes and is finally heated to a maximum degree in its passage through the part 4 which acts as a spreader and supplementary heater. The tank 4 is located directly in the path of the flame and serves to spread or deflect the same outwardly against the inner wall of the boiler so as to heat the same more effectually.

From the foregoing description, taken in connection with the accompanying drawing, the advantages of the construction and the method of operation will be readily apparent to those skilled in the art to which this invention applies, and while I have described the principle of operation of this invention together with the device which I now consider to be the best embodiment thereof, I desire to have it understood that the device is merely illustrative, and that such changes may be made when desired as are within the scope of the claim appended hereto.

Having thus described the invention what is claimed as new is:—

In an annular heater comprising spaced concentric shells forming a boiler, a hollow receptacle located within the space inclosed by the inner wall of said boiler and spaced therefrom and having communication at one point with the water space of the boiler, and having communication at its opposite point with a heat distributing pipe which extends through the water space of the boiler, the opposite or return portion of which is connected to the lower portion of the boiler, said receptacle serving the double function of a spreader and supplementary heater.

NEWTON H. LINES.

Witnesses:
 M. I. LINES,
 O. A. LINES.

Copies of this patent may be obtained for five cents each, by addressing the "Commissioner of Patents, Washington, D. C."